United States Patent
Deng et al.

(10) Patent No.: US 12,039,874 B2
(45) Date of Patent: Jul. 16, 2024

(54) CONTROL METHOD AND DEVICE FOR UNMANNED AERIAL VEHICLE, AND COMPUTER READABLE STORAGE MEDIUM

(71) Applicant: SZ DJI TECHNOLOGY CO., LTD., Shenzhen (CN)

(72) Inventors: Kaiqiang Deng, Shenzhen (CN); Jiabin Liang, Shenzhen (CN); Weiwei Zhang, Shenzhen (CN); Sheng Huang, Shenzhen (CN); Yinzhuo Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 62 days.

(21) Appl. No.: 17/680,304

(22) Filed: Feb. 25, 2022

(65) Prior Publication Data

US 2022/0246040 A1 Aug. 4, 2022

Related U.S. Application Data

(63) Continuation of application No. PCT/CN2019/103851, filed on Aug. 30, 2019.

(51) Int. Cl.
*G06T 7/00* (2017.01)
*B64C 39/02* (2023.01)
(Continued)

(52) U.S. Cl.
CPC ........... *G08G 5/006* (2013.01); *B64C 39/024* (2013.01); *G06T 7/70* (2017.01); *G06V 20/17* (2022.01);
(Continued)

(58) Field of Classification Search
CPC ...... G08G 5/006; G08G 5/003; G08G 5/0069; G08G 5/0086; G06T 7/70;
(Continued)

(56) References Cited

U.S. PATENT DOCUMENTS

2009/0046152 A1* 2/2009 Aman ................ A63B 71/0605
348/157
2020/0066169 A1* 2/2020 Li ......................... G08G 5/0078

FOREIGN PATENT DOCUMENTS

CN 107341851 A 11/2017
CN 108088422 A 5/2018
(Continued)

OTHER PUBLICATIONS

International Search Report and Written Opinion dated May 20, 2020, received for PCT Application PCT/CN2019/103851, Filed on Aug. 30, 2019, 9 pages including English Translation.

*Primary Examiner* — Tiffany P Young
(74) *Attorney, Agent, or Firm* — XSENSUS LLP (57) ABSTRACT

A control method and device for an unmanned aerial vehicle, and a non-transitory computer readable storage medium are provided. The control method may include: acquiring shooting control information, the shooting control information including a height of a shooting target object, a mission height, and an overlapping ratio; determining the target flight route and a shooting interval based upon the shooting control information; and controlling an unmanned aerial vehicle to fly according to the target flight route and to photograph the shooting target object according to the shooting interval by using a photographing device during the flight. The mission height may be a distance between a plane where a target flight route is located and a plane where the shooting target object is located, and a starting plane for computing the overlapping ratio may be the plane where the shooting target is located.

20 Claims, 6 Drawing Sheets

(51) Int. Cl.
*G06T 7/70* (2017.01)
*G06V 20/10* (2022.01)
*G06V 20/17* (2022.01)
*G08G 5/00* (2006.01)
*H04N 23/69* (2023.01)
*B64U 101/30* (2023.01)

(52) U.S. Cl.
CPC ........... *G06V 20/176* (2022.01); *G08G 5/003* (2013.01); *G08G 5/0069* (2013.01); *G08G 5/0086* (2013.01); *H04N 23/69* (2023.01); *B64U 2101/30* (2023.01); *B64U 2201/10* (2023.01); *G06T 2207/10028* (2013.01); *G06T 2207/10032* (2013.01); *G06T 2207/30184* (2013.01); *G06T 2207/30252* (2013.01); *G06V 2201/07* (2022.01)

(58) Field of Classification Search
CPC . G06T 2207/10028; G06T 2207/10032; G06T 2207/30184; G06T 2207/30252; G06V 20/17; G06V 20/176; G06V 2201/07; H04N 23/69; B64C 39/024; B64U 2201/10; B64U 2101/30
USPC .............................................................. 701/3
See application file for complete search history.

(56) References Cited

FOREIGN PATENT DOCUMENTS

| | | |
|---|---|---|
| CN | 108871287 A | 11/2018 |
| CN | 109952755 A | 6/2019 |
| CN | 110057367 A | 7/2019 |
| IN | 106485655 A | 3/2017 |
| KR | 10-1128266 B1 | 3/2012 |

\* cited by examiner

CONTROL METHOD AND DEVICE FOR UNMANNED AERIAL VEHICLE, AND COMPUTER READABLE STORAGE MEDIUM

CROSS-REFERENCE TO RELATED APPLICATION

The present application is a continuation of International Application No. PCT/CN2019/103851, filed Aug. 30, 2019, the entire contents of which being incorporated herein by reference in its entirety.

TECHNICAL FIELD

The present disclosure relates to the field of control technology, and particularly relates to a control method and device for an unmanned aerial vehicle, and a computer-readable storage medium.

BACKGROUND

The principle of three-dimensional modeling based on unmanned aerial vehicles is as follows: acquiring images of a target object photographed by an unmanned aerial vehicle from multiple perspectives, and performing feature point extraction and homonymous point matching, etc. on the captured images to generate a three-dimensional point cloud of the target object. Accurate extraction of feature points and correct matching of homonymous points are critical to correctly recover the three-dimensional point cloud of the target object.

At present, the conventional aerial photography method is that a user manually controls an unmanned aerial vehicle to fly, and manually controls the unmanned aerial vehicle to photograph the target object from multiple perspectives during the flight. However, this aerial photography method is not only complicated to operate, for images captured by this aerial photography method, it is also difficult to accurately extract feature points and correctly match homonymous points during a subsequent three-dimensional modeling. Therefore, how to photograph the target object to ensure that the feature points are accurately extracted, and the homonymous points are correctly matched in the subsequent three-dimensional modeling is a hotspot of current research.

SUMMARY

The present disclosure provides a control method and device for an unmanned aerial vehicle, and a computer-readable storage medium, which may ensure that a shooting target object in actual captured images has a high overlapping ratio, which facilitates complete recovery of a three-dimensional point cloud of the shooting target object in a subsequent three-dimensional modeling process.

According to a first aspect of the present disclosure, a control method of an unmanned aerial vehicle is provided. The unmanned aerial vehicle is equipped with a photographing device, and the control method may include:

acquiring shooting control information, where the shooting control information includes a height of a shooting target object, a mission height, and an overlapping ratio; the mission height is a distance between a plane where a target flight route is located and a plane where the shooting target object is located; and a starting plane for computing the overlapping ratio is the plane where the shooting target object is located;

determining the target flight route and a shooting interval based upon the shooting control information; and controlling the unmanned aerial vehicle to fly according to the target flight route and to photograph the shooting target object according to the shooting interval by using the photographing device during the flight.

According to a second aspect of the present disclosure, a control device for an unmanned aerial vehicle is provided. The unmanned aerial vehicle is equipped with a photographing device, and the control device includes a memory and a processor. The memory is configured to store program instructions; and the processor is configured to execute the program instructions stored in the memory, and when the program instructions are executed, the processor is configured to:

acquire shooting control information, where the shooting control information includes a height of a shooting target object, a mission height, and an overlapping ratio; the mission height is a distance between a plane where a target flight route is located and a plane where the shooting target object is located; and a starting plane for computing the overlapping ratio is the plane where the shooting target object is located;

determine the target flight route and a shooting interval based upon the shooting control information; and control the unmanned aerial vehicle to fly according to the target flight route and to photograph the shooting target object according to the shooting interval by using the photographing device during the flight.

According to a third aspect of the present disclosure, a computer-readable storage medium stored a computer program is provided. When the computer program is executed by a processor, the steps of the control method disclosed in the first aspect of the present disclosure are implemented.

In some embodiments of the present disclosure, a target flight route and shooting interval are automatically determined based upon shooting control information including a height of a shooting target object, a mission height, and an overlapping ratio, which may improve the planning efficiency of the aerial photography mode. In addition, setting a starting plane for computing the overlapping ratio as the plane where the shooting target object is located can ensure that the shooting target object in actual captured images has a high overlapping ratio, which is conducive to accurately extracting feature points of the shooting target object and matching homonymous points in a subsequent three-dimensional modeling, and completely recovering a three-dimensional point cloud of the shooting target object.

It should be understood that the above general description and the following detailed description are only exemplary and explanatory and are not restrictive of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

The technical solutions and technical features encompassed in the exemplary embodiments of the present disclosure will be described in detail in conjunction with the accompanying drawings in the exemplary embodiments of the present disclosure. Apparently, the described exemplary embodiments are part of embodiments of the present disclosure, not all of the embodiments. Based on the embodiments and examples disclosed in the present disclosure, all other embodiments obtained by those of ordinary skill in the art without inventive efforts shall fall within the protection scope of the present disclosure.

Here, exemplary embodiments will be described in detail, and examples thereof are shown in the accompanying drawings. The implementation manners described in the following exemplary embodiments do not represent all implementation manners consistent with the present disclosure. On the contrary, they are only examples of devices and methods consistent with some aspects of the disclosure as detailed in the appended claims. Further, the chart(s) and diagram(s) shown in the drawings are only examples, and does not necessarily include all components, elements, contents and/or operations/steps, nor does it have to be arranged in the described or specific order. For example, certain steps of the method can be performed in other orders or at the same time, some components/elements can also be disassembled, combined, or partially combined; therefore, the actual arrangement may be changed or modified according to actual conditions. In the case of no conflict, the components, elements, operations/steps, and other features disclosed in the embodiments may be combined with each other. In the present disclosure, the terms "photograph" and "shoot" are used interchangeably.

Figure 1:
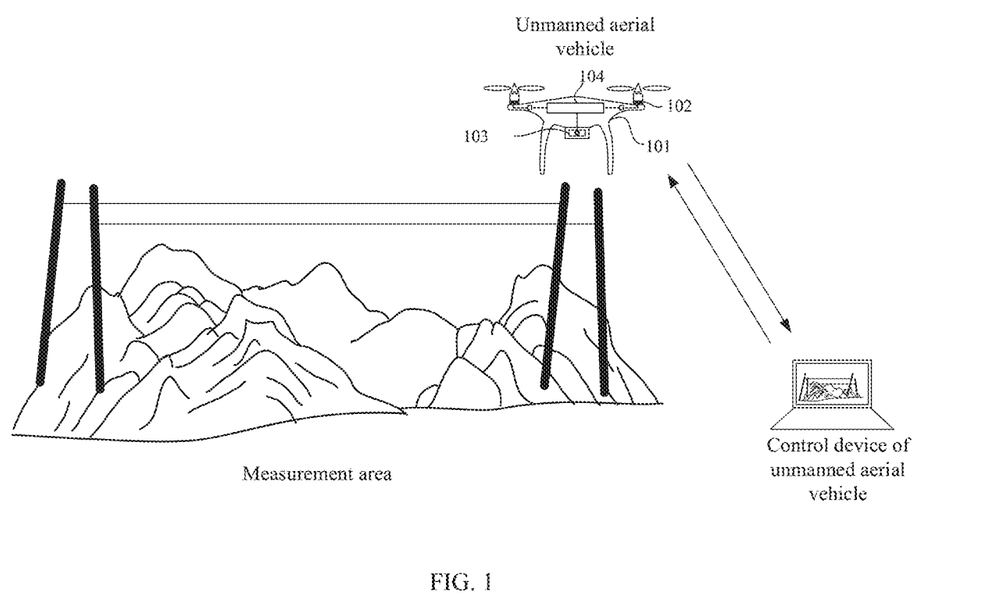
FIG. 1 illustrates a schematic architecture diagram of an image data processing system according to some embodiments of the present disclosure.

Please refer to FIG. 1. FIG. 1 illustrates a schematic structural diagram of an image data processing system according to some embodiments of the present disclosure. As shown in FIG. 1, the image data processing system may include an unmanned aerial vehicle and a control device of the unmanned aerial vehicle. The unmanned aerial vehicle may include a body 101, a power system 102, a photographing device 103 and a flight controller 104. The power system 102 is installed on the body 101 to provide flight power. For example, the power system 102 may include one or more of a propeller, a motor, or an electric regulator. The photographing device 103 is an imaging device, and the imaging device may be a visible light camera, an infrared camera, a thermal imaging camera, a depth camera, etc. In some embodiments, the photographing device 103 is provided on the body 101 of the unmanned aerial vehicle through a stabilizing gimbal. For example, the stabilizing gimbal is installed on the body 101 of the unmanned aerial vehicle, and the photographing device 103 is fixed on the stabilizing gimbal. The stabilizing gimbal can drive the photographing device 103 to rotate about one or more of the yaw axis, roll axis, or pitch axis, thereby adjusting the attitude angle of the photographing device 103 when capturing images. In addition, in some embodiments, the photographing device 103 may also be directly disposed on the body 101 of the unmanned aerial vehicle, and the unmanned aerial vehicle can adjust the attitude angle of the photographing device 103 when capturing images by controlling its own attitude.

In the process of surveying and mapping a measurement area, the control device of the unmanned aerial vehicle may send a target flight route and shooting interval of a surveying and mapping task to the unmanned aerial vehicle, so that the unmanned aerial vehicle moves according to the target flight route and photographs the measurement area at a preset interval. The captured images meet a preset overlapping ratio requirement, that is, the proportion of the overlapping area between adjacent images in the entire image is greater than the overlapping ratio.

The images captured by the unmanned aerial vehicle may be transmitted to the control device of the unmanned aerial vehicle in real time via a wireless communication link. The control device of the unmanned aerial vehicle can perform processing such as feature point extraction, homonymous point matching, etc. on the captured images to generate an orthoimage or a three-dimensional point cloud corresponding to the measurement area. However, the accurate extraction of feature points and the correct matching of homonymous points are the keys to correctly recovering the orthoimage or three-dimensional point cloud corresponding to the measurement area.

Figure 2:
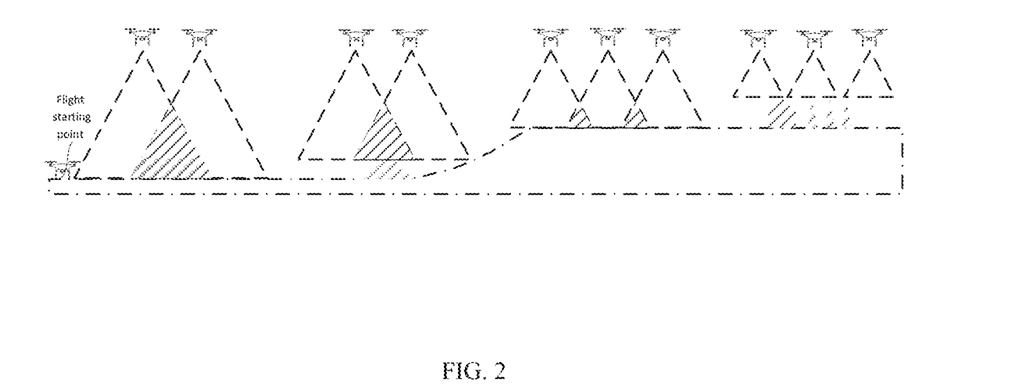
FIG. 2 illustrates a schematic diagram of a correspondence relationship between an overlapping ratio and a height according to some embodiments of the present disclosure.

Please refer to FIG. 2, FIG. 2 illustrates a schematic diagram of a correspondence relationship between an overlapping ratio and a height according to some embodiments of the present disclosure. If the overlapping ratio is computed based on a plane where the take-off point of an unmanned aerial vehicle is located, only when the shooting target object is on the plane where the take-off point of the unmanned aerial vehicle is located, the overlapping ratio of a plane where the shooting target object is located is consistent with the set overlapping ratio. When the plane of the shooting object is higher than the plane where the take-off point of the unmanned aerial vehicle is located, the overlapping ratio of the plane where the shooting target object is located is lower than the set overlapping ratio. The higher the shooting target object is above the take-off point of the unmanned aerial vehicle, the lower the overlapping ratio of the plane of the shooting target object is than the set overlapping ratio. Taking the power transmission line in FIG. 1 as an example, the power transmission line is usually tens of meters higher than the take-off point of the unmanned aerial vehicle. When the overlapping ratio is computed based on the plane where the take-off point of the unmanned aerial vehicle is located, the overlapping ratio of the plane where the power transmission line is located is much smaller than the set overlapping ratio, which leads to the fact that the overlapping ratio of the power transmission lines in actual captured images is much lower than the set overlapping ratio. For example, the towers of the main network line are generally at least 60 meters high. In the existing technology, the take-off plane is used as the starting plane for computing the overlapping ratio. When the overlapping ratio is set to 90%, in fact, the overlapping ratio in the plane where the power transmission line is located is much lower than 90%. In addition, the proportion of the power transmission line in the entire image is generally small. For the image captured by the existing surveying and mapping method, it is difficult to extract and match points on the power transmission line as feature points, therefore, it is difficult to recover depth information of the power transmission line and generate a three-dimensional point cloud corresponding to the power transmission line.

The present disclosure provides a control method of an unmanned aerial vehicle, which is used to control the unmanned aerial vehicle to fly along a specific route and to use a photographing device to capture images at a specific shooting interval during the flight. Specifically, shooting control information including a height of a shooting target object, a mission height, and an overlapping ratio is acquired. The mission height is a distance between a plane where a target flight route is located and a plane where the shooting target object is located. A starting plane for computing the overlapping ratio is the plane where the shooting target object is located. The target flight route and shooting interval are determined based upon the shooting control information. The unmanned aerial vehicle is controlled to fly according to the target flight route and to use the photographing device to photograph the shooting target object according to the shooting interval during the flight.

By adopting the above method, on the one hand, it can automatically set the flight route and shooting interval according to the shooting control information, and control the unmanned aerial vehicle to perform aerial photography tasks according to the set flight route and shooting interval, which improves the efficiency of aerial photography. On the other hand, it can ensure that the shooting target object in actual shooting images has a high overlapping ratio, which is conducive to accurately extracting feature points of the shooting target object and matching homonymous points in the subsequent three-dimensional modeling, and can completely recover the depth information and the three-dimensional point cloud of the shooting target object.

Figure 3:
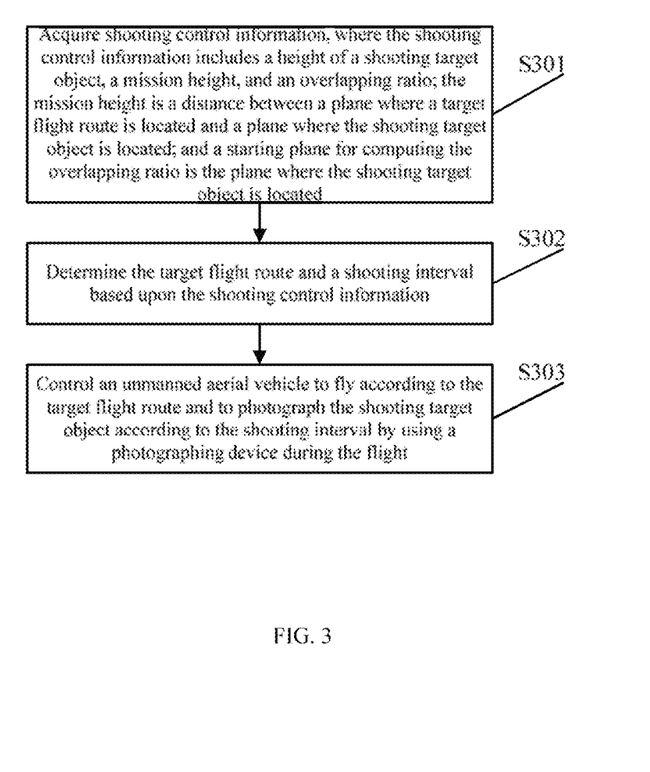
FIG. 3 illustrates a schematic flowchart of a control method of an unmanned aerial vehicle according to some embodiments of the present disclosure.

The control method of the unmanned aerial vehicle provided in the present disclosure may be applied to a flight controller on the unmanned aerial vehicle, may also be applied to a ground control terminal that establishes a communication connection with the unmanned aerial vehicle, and may also be applied to a cloud processor and other equipment that can be used to control the unmanned aerial vehicle. The following takes a ground control terminal, which establishes a communication connection with an unmanned aerial vehicle, as an example to illustratively describe a control method of an unmanned aerial vehicle provided in the present disclosure. FIG. 3 illustrates a schematic flowchart of a control method for an unmanned aerial vehicle according to some embodiments of the present disclosure. As shown in FIG. 3, the control method of the unmanned aerial vehicle may include steps S301-S303:

Step S301 may include acquiring shooting control information, where the shooting control information includes a height of a shooting target object, a mission height, and an overlapping ratio; the mission height is a distance between a plane where a target flight route is located and a plane where the shooting target object is located; and a starting plane for computing the overlapping ratio is the plane where the shooting target object is located.

In some embodiments, the ground control terminal acquires the shooting control information input by a user, and the shooting control information includes the height of the shooting target object, the mission height, and the overlapping ratio. The overlapping ratio includes a side overlapping ratio and a heading overlapping ratio.

In certain embodiments, the height of the shooting target object is a relative height, and the relative height is used to indicate the height of the shooting target object relative to the take-off point of the unmanned aerial vehicle. When the position of the shooting target object is higher than the take-off point of the unmanned aerial vehicle, a negative value of the height difference between the shooting target object and the take-off point of the unmanned aerial vehicle is taken as the relative height of the unmanned aerial vehicle to ensure that the starting plane for computing the overlapping ratio is the plane where the shooting target object is located. For example, if the unmanned aerial vehicle takes off at a position 70 meters below the shooting target object, the height of the take-off point of the unmanned aerial vehicle is −70 meters, and the height of the shooting target object is 0 meters, which is 70 meters in height away from the take-off point of the unmanned aerial vehicle.

In certain embodiments, the shooting target object is a linear object, and the linear object includes a power transmission line.

Step S302 may include determining the target flight route and a shooting interval based upon the shooting control information.

Figure 4:
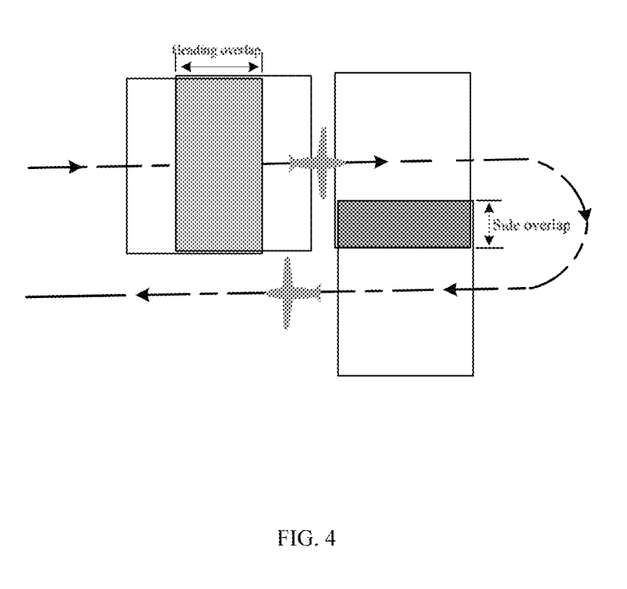
FIG. 4 illustrates a schematic diagram of a side overlap and a heading overlap according to some embodiments of the present disclosure.

In some embodiments, the target flight route includes a multi-segment route, the side overlapping ratio is an overlapping ratio of images corresponding to two adjacent segment routes of the multi-segment route perpendicular to the extension direction of the shooting target object, and the heading overlapping ratio is an overlapping ratio of images corresponding to a route perpendicular to the extension direction of the shooting target object in the multi-segment route. Please refer to FIG. 4, FIG. 4 illustrates a schematic diagram of a side overlap and a heading overlap according to some embodiments of the present disclosure. As shown in FIG. 4, the side overlap refers to the overlap of the same image in two adjacent images captured on two adjacent segment routes. The proportion of the side overlap area in the entire image is called the side overlapping ratio. The heading overlap refers to the overlap of the same image in two adjacent images captured on the same route, and the proportion of the heading overlap area in the entire image is called the heading overlapping ratio. In certain embodiments, the heading overlapping ratio is greater than the side overlapping ratio, an interval range of the heading overlapping ratio is 90% to 95%, and an interval range of the side overlapping ratio is 50% to 60%.

The distance between two adjacent segment routes perpendicular to the extension direction of the shooting target object in the multi-segment route included in the target flight route is determined based upon the mission height of the shooting control information and the side overlapping ratio based on the plane where the shooting target object is located as the starting plane for computing the side overlapping ratio. The shooting interval is determined based upon the mission height of the shooting control information and the heading overlapping ratio based on the plane where the shooting target object is located as the starting place for computing the heading overlapping ratio. The shooting interval includes a shooting time interval and/or a shooting distance interval. A height of the target flight route is determined based upon the height of the shooting target object and the mission height. For example, if the unmanned aerial vehicle takes off at a position 70 meters below the shooting target object, it is necessary to control the unmanned aerial vehicle to fly on a plane 20 meters above the shooting target object. Then, the relative height of the shooting target object relative to the take-off point of the unmanned aerial vehicle is 70 meters, the height of the take-off point of the unmanned aerial vehicle is −70 meters, the height of the shooting target object is 0 meters, and the mission height is 20 meters. Based on the height of the shooting target object and the mission height, it can be determined that the height of the target flight route is 90 meters from the take off point of the unmanned aerial vehicle.

In some embodiments, the shooting control information may further include a target area where the shooting target object is located. A starting point and an ending point of the target flight route may be determined based upon the target area, the height of the shooting target object and the mission height. The starting point and ending point of the target flight route may be in the target area or on the boundary of the target area.

Step S303 may include controlling an unmanned aerial vehicle to fly according to the target flight route and to photograph the shooting target object according to the shooting interval by using a photographing device during the flight.

In some embodiments, the ground control terminal sends the target flight route and shooting interval to the unmanned aerial vehicle; After receiving the target flight route and shooting interval sent by the ground control terminal, the unmanned aerial vehicle flies according to the target flight route, and, during the flight, photographs the shooting target object according to the shooting interval to obtain captured images by using the photographing device equipped on the unmanned aerial vehicle.

In certain embodiments, the number of shots taken by the photographing device on a route perpendicular to the extension direction of the shooting target object is greater than or equal to a preset value, so as to ensure that the shooting target object is captured by a plurality of images when photographing on the route perpendicular to the extension direction of the shooting target object, which is conducive to accurately extracting feature points of the shooting target object and correctly matching homonymous points in the subsequent three-dimensional modeling. In one embodiment, the length of the route perpendicular to the extension direction of the shooting target object may be adjusted to ensure that the number of shots taken by the photographing device on the route perpendicular to the extension direction of the shooting target object is greater than or equal to the preset value. In another embodiment, the heading overlapping ratio in the shooting control information is an interval range, and an appropriate heading overlapping ratio may be selected within the interval range to ensure that the number of shots taken by the photographing device on the route perpendicular to the extension direction of the shooting target object is greater than or equal to the preset value. In yet another embodiment, on the basis of ensuring that the heading overlapping ratio is within the interval range, the shooting interval and/or the mission height may be appropriately adjusted to ensure that the number of shots taken by the photographing device on the route perpendicular to the extension direction of the shooting target object is greater than or equal to the preset value.

In some embodiments, the ground control terminal sends an attitude angle of the photographing device, when the photographing device performs a photographing operation, to the unmanned aerial vehicle so that the photographing device may photograph the shooting target object according to the attitude angle. In certain embodiments, the photographing device is mounted on the body of the unmanned aerial vehicle through a stabilizing gimbal. The ground control terminal may send an attitude angle of the stabilizing gimbal to the unmanned aerial vehicle to control the unmanned aerial vehicle to adjust the attitude angle of the stabilizing gimbal. Accordingly, the attitude angle of the photographing device is adjusted. In other embodiments, the photographing device may perform vertical/tilt shooting of the shooting target object when the photographing device performs a photographing operation. When the photographing device is shooting vertically, the attitude angle is −90 degrees, and when the photographing device is titled to shoot, the range of the attitude angle is −60 degrees to −40 degrees.

In some embodiments, the ground control terminal acquires an image captured by the photographing device of the unmanned aerial vehicle and generates a three-dimensional point cloud of the shooting target object based upon the image. The specific implementation may include the following steps:

(1): Identifying feature points in the image. The feature points refer to pixel points with sharp changes in the image gray value or with greater curvature on the edge of an image (i.e., the intersection of two edges). The feature points may reflect the essential characteristics of the image and may identify the shooting target object in the image. The image matching may be completed by the matching of the feature points. A feature point set may be obtained by performing feature extraction on the image through a preset feature point detection algorithm. The preset feature point detection algorithm may include, but is not limited to, Harris, Features from accelerated segment test (FAST), Difference of Gaussian (DOG), Speeded Up Robust Features (SURF), or other algorithms.

(2): Identifying homonymous points from the identified feature points. Homonymous points refer to feature points corresponding to the same point in the three-dimensional space. The matching of feature points can be accomplished through the calculation of a feature descriptor, so as to determine the homonymous points. The feature descriptor refers to a local descriptor of feature points. For example, the feature descriptor may include, but is not limited to, a DAISY descriptor, a Scale-invariant feature transform (SIFT) descriptor, a Speeded Up Robust Features (SURF) descriptor, or an Oriented FAST and Rotated BRIEF (ORB) descriptor. For example, a feature descriptor may be taken as a high-dimensional vector to calculate a distance between two vectors. Based on the distance, the matching result between feature points corresponding to the feature descriptor is obtained. The distance may be a Euclidean distance or a Hamming distance.

(3): Based upon the determined homonymous points, determining position information and attitude information of the photographing device when capturing the image, where the position information and attitude information of the photographing device when capturing the image can be accurately determined based on the homonymous points; obtaining a depth map corresponding to multiple images based upon the determined position information and attitude information; and determining a three-dimensional point cloud of the shooting target object based upon the depth map.

To better understand the control method of the unmanned aerial vehicle provided in the present disclosure, the following takes a power transmission line as the shooting target object as an example for an illustrative description. To ensure that the power transmission line is captured by multiple images, which will facilitate the accurate extraction of feature points and matching homonymous points in the subsequent three-dimensional modeling process, the overlapping ratio may be set in advance, including the heading overlapping ratio and the side overlapping ratio. To ensure that the overlapping ratio of the power transmission lines in actual captured images is consistent with the set overlapping ratio, the starting plane for computing the overlapping ratio is adjusted to the plane where the power transmission line is located.

For example, a user may input shooting control information through a user interface to indicate that the plane where the power transmission line is located is 70 meters from the take-off plane of the unmanned aerial vehicle, the plane where the target flight route is located 20 meters from the plane where the power transmission line is located, the heading overlapping ratio is 90%, and the side overlapping ratio is 60%.

Figure 5:
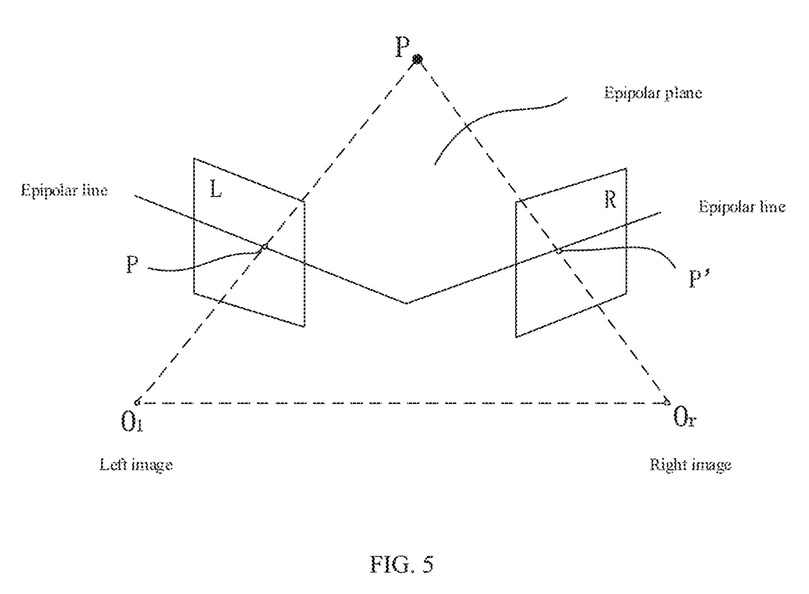
FIG. 5 illustrates a schematic diagram of an epipolar constraint according to some embodiments of the present disclosure.

FIG. 5 illustrates a schematic diagram of an epipolar constraint according to some embodiments of the present disclosure. As shown in FIG. 5, in the process of finding homonymous points based on binocular stereo matching, if there is no prior constraint, for each pixel of the left image, it is necessary to search in the full image space of the right image. This brute force search method is not only inefficient, but also easy to find the wrong corresponding point due to various factors (such as weak texture, repeated texture, etc.). The use of epipolar geometric constraint is one of the effective ways to reduce the search range, improve matching efficiency, and reduce false matching.

An epipolar line is the intersection of an epipolar plane and two images. As shown in FIG. 5, the epipolar plane is the plane where an object point (P) and two camera centers ($O_l$ and $O_r$) are located together; while the epipolar constraint describes that the projected image points (p and p') of the object point (P) on the two images (i.e. left image and right image) must be on the same epipolar plane. It can be further deduced that the homonymous point of each pixel of the left image on the right image must be on the intersection line (i.e. the epipolar line) between the epipolar plane of each such pixel and the right image. The epipolar constraint reduces the original two-dimensional search space to the one-dimensional epipolar space, greatly reducing the search range, and is a very effective constraint for improving matching efficiency.

All pixels on the epipolar line intersecting the same epipolar plane in the left image correspond to the same epipolar line on the right image, forming a corresponding relationship in unit of epipolar line. If all corresponding epipolar line pairs can be found, then matching will be more convenient.

Taking the power transmission line as the shooting target object as an example, when the epipolar line is parallel to the power transmission line, there may be multiple pixels of the power transmission line in the epipolar line on the right image corresponding to a pixel of the transmission line on the left image. Thus, matching along the direction of the epipolar line is prone to errors, which will increase the probability of false matching. Conversely, when the epipolar line is perpendicular to the power transmission line, the probability of false matching is minimum. Therefore, when designing a flight route, it is necessary to ensure that images selected for the depth map estimation in the subsequent three-dimensional modeling are all images captured on a route perpendicular to the extension direction of the power transmission line. In this way, it can ensure that the epipolar line is perpendicular to the power transmission line, so as to reduce the probability of false matching and improve accuracy of depth estimation, thereby improving accuracy of subsequent generation of the three-dimensional point cloud.

To improve efficiency in the depth map estimation, several images whose matching degrees with an image to be processed are greater than a certain threshold are generally selected for matching. Thus, in the embodiments of the present disclosure, the heading overlapping ratio is set to be greater than the side overlapping ratio to ensure that the images selected for the depth map estimation are all images captured on a route perpendicular to the extension direction of the power transmission line.

Figure 6:
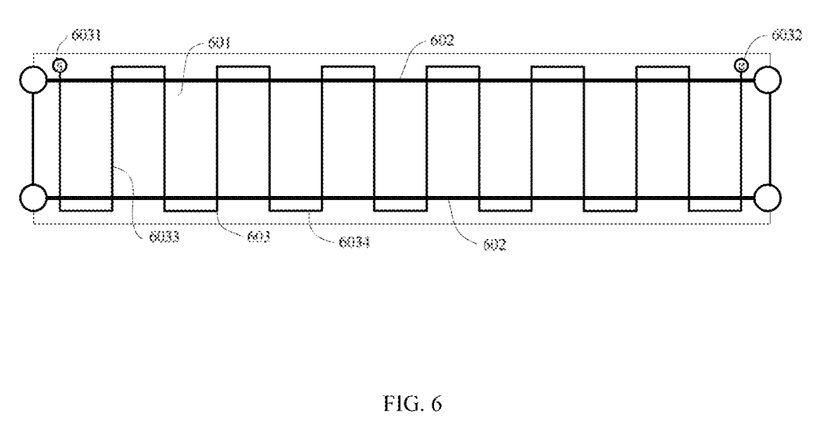
FIG. 6 illustrates a schematic diagram of a flight route according to some embodiments of the present disclosure.

FIG. 6 illustrates a schematic diagram of a flight route according to some embodiments of the present disclosure, which shows a relationship between the target flight route and the power transmission line. As shown in FIG. 6, an area shown in 601 is a target area where a power transmission line 602 is located. The power transmission line 602 extends horizontally within the target area 601. In some embodiments, the target area may be the perimeter area around two adjacent electrical towers connected by the power transmission line. 603 is a target flight route, 6031 is a starting point of the target flight route, 6032 is an ending point of the target flight route, the starting point 6031 and the ending point 6032 are in the target area 601. In some embodiments, the starting point 6031 and the ending point 6032 may be located on the boundary of the target area 601.

The target flight route 603 includes a multi-segment route, and the multi-segment route includes a route 6033 perpendicular to the extension direction of the power transmission line, which is a main route in the target flight route, and a route 6034 between two adjacent segments of the main route 6033. Among them, the distance between two adjacent segments of the main route 6033 is determined based upon the mission height of the shooting control information and the side overlapping ratio based on the plane where the shooting target object is located as the starting plane for computing the side overlapping ratio. The starting point and the ending point of the target flight route are determined based upon the target area, the height of the shooting target object, and the mission height of the shooting control information. The height of the target flight route is determined based upon the height of the shooting target object and the mission height of the shooting control information. It should be noted that the route 6034 between two adjacent segment main routes 6033 may be a straight trajectory parallel to the extension direction of the power transmission line, or a curved trajectory.

Figure 7:
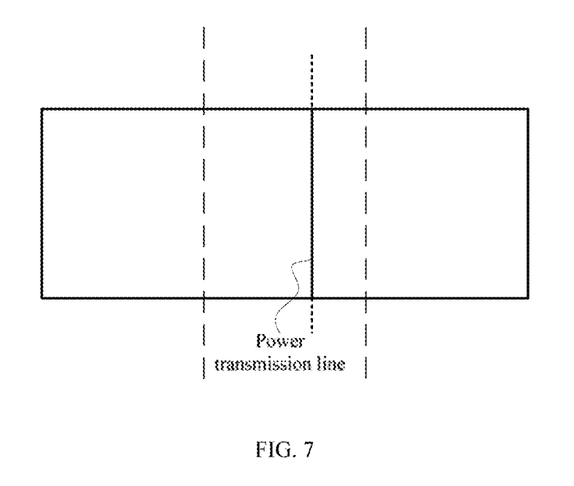
FIG. 7 illustrates a schematic diagram of a captured image according to some embodiments of the present disclosure.

Further, the shooting interval is determined based upon the mission height of the shooting control information and the heading overlapping ratio based on the plane where the shooting target object is located as the starting plane for computing the heading overlapping ratio. After determining the target flight route and the shooting interval as shown in FIG. 6, the unmanned aerial vehicle is controlled to fly according to the target flight route, and the photographing device equipped on the unmanned aerial vehicle is used to photograph the power transmission line according to the shooting interval during the flight. In some embodiments, the number of shots taken by the photographing device on each route perpendicular to the extension direction of the power transmission line is greater than or equal to a preset value (for example, 5 times) to ensure that the power transmission line is captured by multiple images on the route perpendicular to the extension direction of the power transmission line, which facilitates the accurate extraction of feature points and correct matching of homonymous points in the subsequent three-dimensional modeling. In other embodiments, in an image captured by the photographing device on an edge route of the target flight route, the distance between the power transmission line and the edge route where the extension direction of the image is consistent with the extension direction of the power transmission line is greater than a preset distance. The edge route may refer to an edge of a route perpendicular to the extension direction of the power transmission line in the target flight route, or a route between two adjacent segment routes perpendicular to the extension direction of the transmission line in the target flight route. Please also refer to FIG. 7, FIG. 7 illustrates a schematic diagram of a captured image according to some embodiments of the present disclosure, which is a schematic diagram of an image captured on an edge route of the target flight route. It can be seen that the power transmission line is more than ⅓ on the right side of the image or more than ⅓ on the left side of the image.

The aerial photography scheme disclosed above may ensure that the overlapping ratio of the power transmission line in actual captured images is consistent with the set overlapping ratio, and further ensure that images selected for the depth map estimation in the subsequent three-dimensional modeling are all images captured along a flight route perpendicular to the extension direction of the power transmission line. It is helpful for accurately extracting feature points of the shooting target object and matching homonymous points in the subsequent three-dimensional modeling, so as to completely recover the three-dimensional point cloud of the shooting target object.

In some embodiments of the present disclosure, the target flight route and shooting interval are automatically determined based upon the shooting control information including the height of the shooting target object, the mission height, and the overlapping ratio, which improves the planning efficiency of the aerial photography mode. In addition, setting the starting plane for computing the overlapping ratio as the plane where the shooting target object is located can ensure that the shooting target object in actual captured images has a high overlapping ratio, which is conducive to accurately extracting feature points of the shooting target object and matching homonymous points in the subsequent three-dimensional modeling, and completely recovering the three-dimensional point cloud of the shooting target object.

Figure 8:
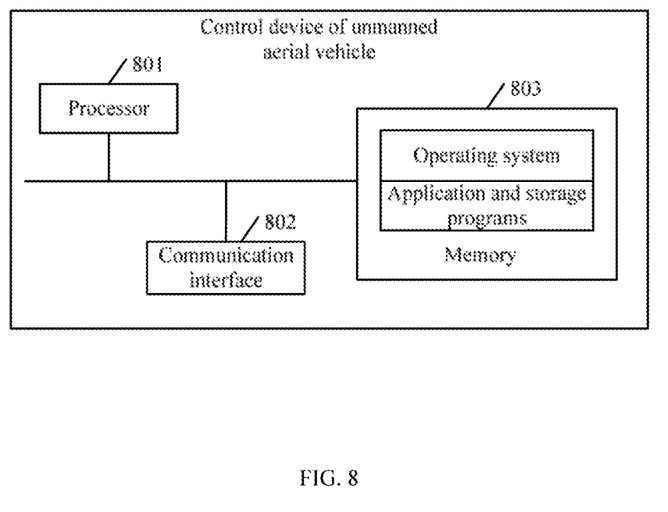
FIG. 8 illustrates a schematic structural diagram of a control device for an unmanned aerial vehicle according to some embodiments of the present disclosure.

FIG. 8 illustrates a schematic structural diagram of a control device for an unmanned aerial vehicle according to some embodiments of the present disclosure. As shown in FIG. 8, the control device of the unmanned aerial vehicle may include a processor 801, a communication interface 802, and a memory 803. The processor 801, the communication interface 802, and the memory 803 may be connected through a bus or in other ways. In some embodiments, the connection is through a bus.

The processor 801 may be a central processing unit (CPU), a network processor (NP), or a combination of a CPU and an NP. The processor 801 may also be a multi-core CPU or a core used to implement communication identification bound in a multi-core NP.

The processor 801 may be a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The communication interface 802 may be used for the exchange of sending and receiving information or signaling, as well as the reception and transmission of signals. The memory 803 may mainly include a storage program area and a storage data area. The storage program area may store an operating system and at least one stored program required by a function (such as a text storage function, a location storage function, etc.); the storage data area may store data (such as image data, text data) created according to the use of the device, etc., and may include application and storage programs, etc. In addition, the memory 803 may include a high-speed random access memory, and may also include a non-volatile memory, such as at least one magnetic disk storage device, a flash memory device, or other volatile solid-state storage devices.

The memory 803 may also be used to store program instructions. The processor 801 is configured to execute the program instructions stored in the memory 803. When the program instructions are executed, the processor 801 is configured to:

acquire shooting control information, where the shooting control information includes a height of a shooting target object, a mission height, and an overlapping ratio; the mission height is a distance between a plane where a target flight route is located and a plane where the shooting target object is located, and a starting plane for computing the overlapping ratio is the plane where the shooting target object is located;

determine the target flight route and a shooting interval based upon the shooting control information; and control an unmanned aerial vehicle to fly according to the target flight route and to photograph the shooting target object according to the shooting interval by using a photographing device during the flight.

The methods executed by the processor in the present disclosure are all described from the perspective of the processor. It will be appreciated that the processor requires the cooperation of other hardware structures to execute the foregoing methods. The embodiments of the present disclosure do not describe and limit the specific implementation process in detail.

In some embodiments, the shooting target object is a linear object, and the linear object includes a power transmission line.

In some embodiments, the target flight route includes a multi-segment route. The overlapping ratio includes a side overlapping ratio and a heading overlapping ratio, the side overlapping ratio is an overlapping ratio of images corresponding to two adjacent segment routes perpendicular to an extension direction of the shooting target object in the multi-segment route, the heading overlapping ratio is an overlapping ratio of images corresponding to a route perpendicular to the extension direction of the shooting target object in the multi-segment route, and the heading overlapping ratio is greater than the side overlapping ratio.

In some embodiments, a distance between two adjacent segment routes of the multi-segment route perpendicular to the extension direction of the shooting target object is determined based upon the mission height and the side overlapping ratio; and the shooting interval is determined based upon the mission height and the heading overlapping ratio.

In some embodiments, an interval range of the heading overlapping ratio is 90% to 95%, and an interval range of the side overlapping ratio is 50% to 60%.

In some embodiments, the number of shots taken by the photographing device on a route perpendicular to the extension direction of the shooting target object is greater than or equal to a preset value.

In some embodiments, the shooting interval includes a shooting time interval and/or a shooting distance interval.

In some embodiments, a height of the target flight route is determined based upon the height of the shooting target object and the mission altitude.

In some embodiments, the shooting control information further includes a target area where the shooting target object is located, and a starting point and an ending point of the target flight route are determined based upon the target area, the height of the shooting target object, and the mission height.

In some embodiment, when the processor 801 is configured to control the unmanned aerial vehicle to fly according to the target flight route and to photograph the shooting target object according to the shooting interval by using the photographing device during the flight, the processor 801 is configured to send the target flight route and the shooting interval to the unmanned aerial vehicle through the communication interface 802, and to control the unmanned aerial vehicle to fly according to the target flight route and to photograph the shooting target object according to the shooting interval by using the photographing device during the flight.

In some embodiments, the processor 801 is further configured to send an attitude angle of the photographing device when performing a photographing operation to the unmanned aerial vehicle through the communication interface so that the photographing device photographs the shooting target object according to the attitude angle.

In some embodiments, the processor 801 is further configured to obtain an image captured by the photographing device through the communication interface 802 and generate a three-dimensional point cloud of the shooting target object based upon the image.

The specific principles and implementation manners of the control device for the unmanned aerial vehicle provided in the embodiments of the present disclosure are similar to the control methods of the foregoing embodiments and will not be repeated herein for conciseness.

Thus, in the embodiments of the present disclosure, the target flight route and shooting interval are automatically determined based upon the shooting control information including the height of the shooting target object, the mission height, and the overlapping ratio, which improves the planning efficiency of the aerial photography mode; in addition, setting the starting plane for computing the overlapping ratio as the plane where the shooting target object is located may ensure that the shooting target object in actual captured images has a high overlapping ratio, which is conducive to accurately extracting feature points of the shooting target object and matching homonymous points in the subsequent three-dimensional modeling, and completely recovering the three-dimensional point cloud of the shooting target object.

The present disclosure also provides a computer-readable storage medium having stored a computer program therein. When the computer program is executed by a processor, the control method of the unmanned aerial vehicle provided in the present disclosure is implemented.

The present disclosure further provides a computer program product containing program instructions. When running on a computer, the computer program product causes the computer to execute the control method of the unmanned aerial vehicle provided in the present disclosure.

The computer-readable storage medium may be an internal storage unit of the control device described in any of the foregoing embodiments, such as a hard disk or a memory of the control device. The computer-readable storage medium may also be an external storage device of the control device, such as a plug-in hard disk, a smart media card (SMC), and a secure digital (SD) card, a flash card, etc., equipped on the control device.

The computer readable storage medium may be a tangible device that can store programs and instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer program and the program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive program instructions from the network and forward the program instructions for storage in a computer readable storage medium within the computing or processing device.

The computer program and the program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer program and program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the program instructions by using information from the program instructions to configure or customize the electronic circuitry, in order to perform aspects of the present disclosure.

The computer program and the program instructions that may implement the device/systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer program and program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer program and the program instructions may also be loaded onto a computer, other programmable apparatus, or other device to cause a series of operational steps to be performed on the computer, other programmable apparatus, or other device to produce a computer implemented process, such that the instructions which execute on the computer, other programmable apparatus, or other device implement the functions specified in the flow diagrams and block diagrams in the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The processor may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core 5 and Core i7 from Intel Corporation; Opteron, Phenom, Athlon, Turion and Ryzen from AMD; and Cortex-A, Cortex-R and Cortex-M from Arm.

The memory and non-volatile storage medium may be computer-readable storage media. The memory may include any suitable volatile storage devices such as dynamic random access memory (DRAM) and static random access memory (SRAM). The non-volatile storage medium may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

The program may be a collection of machine readable instructions and/or data that is stored in non-volatile storage medium and is used to create, manage, and control certain software functions that are discussed in detail elsewhere in the present disclosure and illustrated in the drawings. In some embodiments, the memory may be considerably faster than the non-volatile storage medium. In such embodiments, the program may be transferred from the non-volatile storage medium to the memory prior to execution by a processor.

Each part of the present disclosure may be implemented by hardware, software, firmware, or a combination thereof. In the above exemplary embodiments, multiple steps or methods may be implemented by hardware or software stored in a memory and executed by a suitable instruction execution system.

The terms used herein are only for the purpose of describing specific embodiments and are not intended to limit of the disclosure. As used in this disclosure and the appended claims, the singular forms "a," "an," and "the" are intended to include the plural forms as well, unless the context clearly indicates otherwise. It should also be understood that the term "and/or" as used herein refers to and encompasses any or all possible combinations of one or more associated listed items. Terms such as "connected" or "linked" are not limited to physical or mechanical connections, and may include electrical connections, whether direct or indirect. Phrases such as "a plurality of," "multiple," or "several" mean two and more.

Finally, it should be noted that the above embodiments/examples are only used to illustrate the technical features of the present disclosure, not to limit them; although the present disclosure has been described in detail with reference to the foregoing embodiments and examples, those of ordinary skill in the art should understand that: the technical features disclosed in the foregoing embodiments and examples can still be modified, some or all of the technical features can be equivalently replaced, but, these modifications or replacements do not deviate from the spirit and scope of the disclosure.

What is claimed is:

1. A control method for an aerial vehicle comprising a photographing device, comprising:
   acquiring shooting control information, wherein the tooting control information comprises a height of a shooting target object, a mission height, and an overlapping ratio; the height of the shooting target object is a height of the shooting target object relative to a take-off point of the aerial vehicle; the mission height is a distance between a plane where a target flight route is located and a plane where the shooting target object is located; and the overlapping ratio is computed using the plane where the shooting target object is located as a starting plane;
   determining the target flight route and a shooting interval based upon the shooting control information; and
   controlling the aerial vehicle to fly according to the target flight route and to photograph the shooting target Object according to the shooting interval by using the photographing device during, the flight,
   wherein the determining the target flight route comprises determining a height of the target flight route based on the height of the shooting target object and the mission height; and
   the determining the shooting interval is performed based on the mission height and the overlapping ratio that is computed using the plane where the shooting target object is located as the starting plane; the plane where the shooting target object is located being higher than the take-off point of the aerial vehicle.

2. The control method of claim 1, wherein the shooting target object is a linear object, and the linear object comprises a power transmission line.

3. The control method of claim 1, wherein the target flight route comprises a multi-segment route, the overlapping ratio comprises a side overlapping ratio id a heading overlapping ratio, and the heading overlapping ratio is greater than the side overlapping ratio, wherein the side overlapping ratio is an overlapping ratio of images corresponding to two adjacent segment routes of the multi-segment route perpendicular to an extension direction of the shooting target object, and the heading overlapping ratio is an overlapping ratio of images corresponding to a route perpendicular to the extension direction of the shooting target object in the multi-segment route.

4. The control method of claim 3, wherein a distance between the two adjacent segment routes perpendicular to the extension direction of the shooting target object in the segment route is determined based upon the mission height and the side overlapping ratio; and the shooting interval is determined based upon the mission height and the heading overlapping ratio.

5. The control method of claim 3, wherein an interval range of the heading overlapping ratio is 90% to 95%; and an internal range of the side overlapping ratio is 50% to 60%.

6. The control method of claim 1, wherein the number of shots taken by the photographing device on a route perpendicular to a extension direction of the shooting target object is greater than or equal to a preset value.

7. The control method of claim 1, wherein the shooting interval comprises a shooting tune interval and/or a shooting distance interval.

8. The control method of claim 1, wherein the shooting control information further comprises a target area where the shooting target object is located; and a starting point and an ending point of the target flight route are determined based upon the target area, the height of the shooting target object and the mission height.

9. The control method of claim 1, wherein the controlling the aerial vehicle to fly according to the target flight route to and to photograph the shooting target object according to the shooting interval by using the photographing device during the flight comprises:
   sending the target flight route and the shooting inter al to the aerial vehicle; and
   controlling the aerial vehicle to fly according to the target flight route and to photograph the shooting target object according to the shooting interval by using the photographing device during the flight.

10. The control method of claim 9, wherein the control method further comprises sending an attitude angle of the photographing device when performing a photographing operation to the aerial vehicle so that the photographing device photographs the shooting target object according to the attitude angle.

11. The control method of claim 1, further comprising:
   acquiring images captured by the photographing device; and
   generating a three-dimensional point cloud of the shooting target object based upon the images.

12. The control method of claim 1, wherein the take-off point of the aerial vehicle is ground.

13. A control device for an aerial vehicle, wherein the aerial vehicle comprises a photographing device; and the control device comprises a memory and a processor, the memory configured to store program instructions, the processor configured to execute the program instructions stored in the Memory, and when the program instructions are executed, configured to:
   acquire shooting control information, wherein the shooting control information comprises a height of a Shooting target object, a mission height, and an overlapping ratio; the height of the shooting target object is a height of the shooting target object relative to a take-off point of the aerial vehicle; the mission height is a distance between a plane where a target flight route is located and a plane where the shooting target object is located; and the overlapping ratio is computed using the plane where the shooting target object is located as a starting plane;
   determine the target flight route and a shooting interval based upon the shooting control information; and
   control the aerial vehicle to fly according to the target flight route and to photograph the shooting target Object according to the Shooting interval by using the photographing device during, the flight,
   wherein the determining the target flight route comprises determining a height of the target flight route based on the height of the shooting target object and the mission height; and
   the determining the shooting interval is performed based on the mission height and the overlapping ratio that is computed using the plane where the shooting target object is located as the starting plane, the plane where the shooting target object is located being higher than the take-off point of the aerial vehicle.

14. The control device of claim 13, wherein the shooting, target object is a linear object, the linear object comprises a power transmission line, and the take-off point of the aerial vehicle is ground.

15. The control device of claim 13, wherein the target flight route comprises a multi-segment route, the overlapping ratio comprises a side overlapping ratio and a heading overlapping ratio, and the heading overlapping ratio is greater than the side overlapping ratio, wherein the side overlapping ratio is an overlapping ratio of images corresponding to two adjacent segment routes of the multi-segment route perpendicular to an extension direction of the shooting target object, and the heading overlapping ratio is an overlapping ratio of images corresponding to a route perpendicular to the extension direction of the shooting target object the multi-segment route.

16. The control device of claim 15, wherein a distance between the two adjacent segment routes perpendicular to the extension direction of the shooting target object in the multi-segment route is determined based upon tire mission height and the side overlapping ratio; and the shooting interval is determined based upon the mission height and the heading overlapping ratio.

17. The control device of claim 15, wherein an interval range of the heading overlapping ratio is 90% to 95%; and an interval range of the side overlapping ratio is 50% to 60%.

18. The control device of claim 13, wherein the number of shots taken by the photographing device on a route perpendicular to an extension direction of the shooting target object is greater than or equal to a preset value.

19. The control device of claim 13, wherein the shooting interval comprises a shoo Ina time interval and/or a shooting distance interval.

20. A non-transitory computer-readable storage medium stored a computer program, wherein when the computer program is executed by a processor, the processor is configured to implement any step of the control method of claim 1.

* * * * *